United States Patent
Takamori et al.

(10) Patent No.: US 11,885,070 B2
(45) Date of Patent: Jan. 30, 2024

(54) PAPERMAKING BELT AND METHOD FOR PRODUCING PAPERMAKING BELT

(71) Applicant: ICHIKAWA CO., LTD., Tokyo (JP)

(72) Inventors: Yuya Takamori, Tokyo (JP); Taichi Sakai, Tokyo (JP)

(73) Assignee: ICHIKAWA CO., LTD., Tokyo (JP)

( * ) Notice: Subject to any disclaimer, the term of this patent is extended or adjusted under 35 U.S.C. 154(b) by 1 day.

(21) Appl. No.: 17/658,457

(22) Filed: Apr. 8, 2022

(65) Prior Publication Data

US 2022/0341094 A1 Oct. 27, 2022

(30) Foreign Application Priority Data

Apr. 27, 2021 (JP) .................................. 2021-075447

(51) Int. Cl.
| | |
|---|---|
| *D21F 7/08* | (2006.01) |
| *C08L 75/04* | (2006.01) |
| *D21F 2/00* | (2006.01) |
| *D21F 3/02* | (2006.01) |

(52) U.S. Cl.
CPC ................ *D21F 7/08* (2013.01); *C08L 75/04* (2013.01); *D21F 2/00* (2013.01); *D21F 3/029* (2013.01); *C08L 2312/00* (2013.01)

(58) Field of Classification Search
CPC ... D21F 7/08; D21F 2/00; D21F 3/029; D21F 3/0227; C08L 75/04; C08L 2312/00
See application file for complete search history.

(56) References Cited

U.S. PATENT DOCUMENTS

| | | | | |
|---|---|---|---|---|
| 2014/0076511 | A1* | 3/2014 | Inoue ..................... | D21F 2/00 162/202 |
| 2017/0051455 | A1* | 2/2017 | Sugawara ............... | D21F 7/086 |

FOREIGN PATENT DOCUMENTS

| | | |
|---|---|---|
| CN | 103102469 B | 11/2014 |
| EP | 3 133 206 A1 | 2/2017 |
| JP | 2014-062337 A | 4/2014 |
| JP | 2014-062338 A | 4/2014 |
| JP | 2014-62338 A | 4/2014 |

OTHER PUBLICATIONS

Extended European Search Report dated Sep. 27, 2022, in corresponding European Patent Application No. 22167073.0 citing documents 15-17 therein, 6 pages.

* cited by examiner

*Primary Examiner* — Jacob T Minskey
*Assistant Examiner* — Matthew M Eslami
(74) *Attorney, Agent, or Firm* — Oblon, McClelland, Maier & Neustadt, L.L.P.

(57) ABSTRACT

A papermaking belt in which changes in surface properties of the resin layer upon use is suppressed, and a method for making the papermaking belt. Provided is a papermaking belt for use in a papermaking machine, including at least one resin layer including a resin, wherein the surface roughness after contacting the surface of the resin layer with a metal plate having a surface roughness equal to or less than 0.10 μm at a pressure of 100±3 kg/cm² for 20 hours in warm water bathing at 70±5° C. is equal to or higher than 40% relative to the surface roughness of the surface of the resin layer in a wet state before the contact.

10 Claims, 6 Drawing Sheets

PAPERMAKING BELT AND METHOD FOR PRODUCING PAPERMAKING BELT

CROSS REFERENCE TO RELATED APPLICATIONS

This application is based upon and claims benefit of priority from Japanese Patent Application No. 2021-075447, filed on Apr. 27, 2021, the entire contents of which are incorporated herein by reference.

BACKGROUND

Technical Field

The present invention relates to a papermaking belt and a method for producing a papermaking belt.

Background Art

A papermaking machine that removes water from a raw paper material is generally provided with a wire part, a press part and a dryer part. These wire part, press part and dryer part are arranged in this order along the transfer direction of the wet paper.

In each part of such a papermaking machine, various papermaking belts are used for the purpose of transferring or compressing of wet paper, etc. Such papermaking belts include, for example, a wet paper transfer belt for transferring and delivering of wet paper (a transfer belt), a shoe press belt used in a shoe press mechanism, etc.

With respect to delivery of wet paper using a wet paper transfer belt in the press part, as a papermaking machine, a closed-draw type papermaking machine has currently been known, in which a wet paper is delivered in a closed-draw manner. In the press part of the closed-draw type papermaking machine, the wet paper is transferred while being mounted on a felt for papermaking or a wet paper transfer belt, so that the wet paper never travels alone, preventing the paper from being disconnected. Therefore, a closed-draw type papermaking machine is excellent regarding an aptitude for high speed running and operation stability.

On the other hand, in order to appropriately carry out the delivery of wet paper in the closed-draw type papermaking machine, the wet paper transfer belt is required to have a function of transferring the wet paper while keeping the wet paper being adhered onto it (wet paper adherence), and a function of smoothly releasing the wet paper when delivering the wet paper to the rear stage (wet paper detachability). Therefore, in order to implement such conflicting functions, the adherence of the wet paper-carrying surface of the wet paper transfer belt to the wet paper is an important factor.

JP 2014-062337 A and JP 2014-062338 A disclose wet paper transfer belts in which the wet paper contact surface of a wet paper-carrying resin layer has an arithmetic surface roughness within a predetermined range depending on base paper basis weight of the wet paper and the swelling ratio of the resin constituting the resin layer to water.

SUMMARY

Technical Problem

On the other hand, in a papermaking machine, the wet paper is continuously transferred at a high speed, for example, at a rate of 1000 m/min or higher. Under such a severe condition, in terms of the papermaking belt, the surface properties of the wet paper transfer belt could change due to an abrasion associated with the traveling or by being pressed in the press mechanism. The papermaking belt will also be polluted as being used. As a result, the wet paper adherence and wet paper detachability of the papermaking belt could change from the originals. In such case, if the wet paper transfer belt is used for a long time, there can be a problem that the wet paper will not adequately be transferred. In a conventional papermaking belt, there still is a room for further improvement regarding this point.

Accordingly, an object of the present invention is to provide a papermaking belt in which changes in a surface properties of the resin layer upon use are suppressed and a method for producing the papermaking belt.

Solution to Problem

The present inventors have made intensive studies in order to achieve the aforementioned object and as a result focused on that a papermaking belt is used in a papermaking machine in a wet state. The present inventors then found that the level of the change in the surface roughness of the resin layer of the papermaking belt in wet state is associated with the changes in surface properties of the resin layer. The present inventors further found that using polycarbodiimide is effective for maintaining the surface roughness of the resin layer of the papermaking belt in a wet state, further proceeded with the investigation, and thus accomplished the present invention.

A gist of the present invention is as follows:

[1] A papermaking belt for use in a papermaking machine, comprising at least one resin layer comprising a resin, wherein:

the surface roughness after contacting the surface of the resin layer with a metal plate having a surface roughness equal to or less than 0.10 μm at a pressure of 100±3 kg/cm$^2$ for 20 hours in warm water bathing at 70±5° C. is equal to or higher than 40% relative to the surface roughness of the surface of the resin layer in a wet state before the contact.

[2] The papermaking belt according to [1], wherein at least the resin close to the surface of the resin layer has been crosslinked with polycarbodiimide.

[3] A papermaking belt for use in a papermaking machine, comprising at least one resin layer comprising a resin, wherein:

at least the resin close to the surface of the resin layer has been crosslinked with polycarbodiimide.

[4] The papermaking belt according to any one of [1] to [3], wherein the surface roughness of the surface of the resin layer in a wet state is equal to or higher than 0.3 μm and equal to or less than 20 μm.

[5] The papermaking belt according to any one of [1] to [4], wherein at least the resin close to the surface of the resin layer comprises an N-acylurea bond and/or an isourea bond.

[6] The papermaking belt according to any one of [1] to [5], wherein the resin layer comprises an urethane resin.

[7] The papermaking belt according to [6], wherein the urethane resin comprises an aqueous urethane resin.

[8] The papermaking belt according to any one of [1] to [7], wherein the surface of the resin layer comprises a wet paper contact surface.

[9] The papermaking belt according to any one of [1] to [8], wherein the papermaking belt is a wet paper transfer belt.

[10] The papermaking belt according to any one of [1] to [8], wherein the papermaking belt is a shoe press belt.

[11] A method for producing a papermaking belt comprising a step of forming at least one resin layer, wherein:

in which step, at least the resin close to the surface of the resin layer to be formed is crosslinked with polycarbodiimide.

Advantageous Effects of Invention

The above-mentioned configuration allows for providing a papermaking belt in which changes in surface properties of the resin layer upon use are suppressed and a method for producing the papermaking belt.

DESCRIPTION OF THE EMBODIMENTS

Hereinafter, referring to the appended drawings, preferred embodiments of a papermaking belt and a method for producing a papermaking belt according to the present invention will be described in detail.

<1. Papermaking Belt>

First, a papermaking belt according to a preferred embodiment of the present invention will be described.

Figure 1:
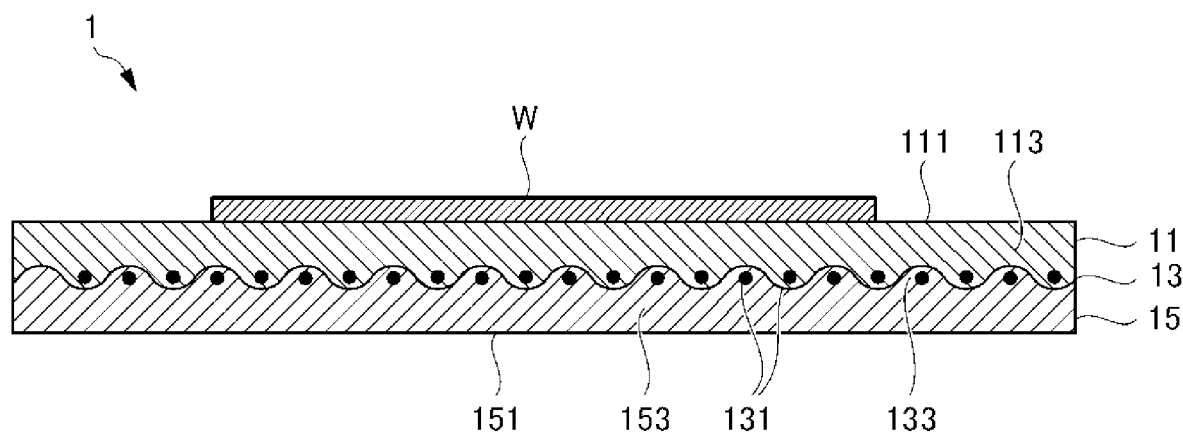
FIG. 1 is a cross-sectional view in a cross machine direction showing a papermaking belt according to one embodiment of the present invention.

FIG. 1 is a cross-sectional view in a cross machine direction showing an example of a papermaking belt according to a preferred embodiment of the present invention. Note that, in the drawing, each member has been emphasized in size as appropriate for ease of illustration and thus does not indicate the actual proportion and size of each member. Herein, the aforementioned cross machine direction may be referred to as "CMD", and the machine direction may be referred to as "MD". It is also noted that, in this embodiment, a wet paper transfer belt is illustrated as one example of a papermaking belt, though the papermaking belt of the present invention is not limited thereto.

A wet paper transfer belt (papermaking belt) 1 shown in FIG. 1 is used for transferring and delivering a wet paper W in a press part of a papermaking machine. The wet paper transfer belt 1 forms an endless band-shaped body. That is, the wet paper transfer belt 1 is an annular belt. In addition, a circumferential direction of the wet paper transfer belt 1 is generally disposed along a machine direction (MD) of the papermaking system.

The wet paper transfer belt 1 has a reinforcing fibrous substrate layer 13, a first resin layer (wet paper-carrying side resin layer) 11 built on one principal plane on the outer surface side of the reinforcing fibrous substrate layer 13, and a second resin layer (roll side resin layer) 15 built on the other principal plane on the inner surface side of the reinforcing fibrous substrate layer 13, and these layers are laminated to form the wet paper transfer belt 13. The first resin layer also forms the outer side surface (outer circumferential surface) of the ring formed by the wet paper transfer belt 1.

The first resin layer 11 is built on one principal plane of the reinforcing fibrous substrate layer 13, and is mainly composed of resin 113.

The first resin layer 11 comes into contact with the wet paper on one principal plane that is opposite to the principal plane that is joined to the reinforcing fibrous substrate layer 1, and also constitutes a wet paper-carrying surface 111 for carrying a wet paper W. That is, the wet paper transfer belt 1 can carry the wet paper W on the wet paper-carrying surface 111 of the first resin layer 11 and can transfer the wet paper W.

In this embodiment, the surface roughness of the wet paper-carrying surface 111 after contacting the wet paper-carrying surface 111 of the first resin layer 11 with a metal plate having a surface roughness equal to or less than 0.10 μm at a pressure of 100±3 kg/cm² for 20 hours in warm water bathing at 70° C.±5 is equal to or higher than 40% relative to the surface roughness of the wet paper-carrying surface 111 of the first resin layer 11 before contacting. Hereinbelow, the ratio of a surface roughness of a wet paper-carrying surface 111 of the first resin layer 11 after contacting of the wet paper-carrying surface 111 of the first resin layer 11 to a surface roughness of the wet paper-carrying surface 111 of the first resin layer 11 before the contacting is referred to as a roughness holding rate. The present inventors found that the roughness holding rate of the wet paper-carrying surface 111 in a wet state is thus associated with the changes in the properties of the wet paper-carrying surface 111, and that the changes in the properties of the wet paper-carrying surface 111 of wet paper transfer belt 1 can be suppressed by having the roughness holding rate equal to or higher than 40%.

In specific, the surface roughness of the wet paper-carrying surface 111 influences on a function of transferring the wet paper while keeping the wet paper being adhered onto it (wet paper adherence), a function of smoothly releasing the wet paper when delivering the wet paper to the rear stage (wet paper detachability), etc. On the other hand, in general, the surface roughness of the wet paper-carrying surface 111 is measured immediately after production and before wetting. The present inventors found and focused on that such pre-wetting surface roughness of the wet paper-carrying surface 111 cannot actually be regarded to be the same as the surface roughness of the wet paper-carrying surface 111 in a wet state where the wet paper transfer belt 1 is actually used, and that the surface roughness of the wet paper-carrying surface 111 changes over time as being used. The present inventors then found that the changes in the properties, in specific changes in the wet paper adherence and wet paper detachability, of the wet paper-carrying surface 111 when being used can be comprehended by using as an index the roughness holding rate of the wet paper-carrying surface 111 in a wet state as mentioned above. The present inventors then found that the changes in the wet paper adherence and wet paper detachability of the wet paper transfer belt 1 can be suppressed by providing the roughness holding rate of the wet paper-carrying surface 111 in a wet state equal to or higher than 40%, which enables a long-term and stable transfer of the wet paper.

The holding rate of the roughness of a wet paper-carrying surface 111 of a wet paper transfer belt 1 can be obtained as follows:

First, the surface roughness (arithmetic average roughness Ra) of the wet paper-carrying surface 111 of the wet paper transfer belt 1 before the contact process mentioned hereinafter is measured. The surface roughness of the wet paper-carrying surface 111 of the wet paper transfer belt 1 before the contact process is measured in a wet state. First, a sample of the wet paper transfer belt 1 is immersed in a constant temperature water bath at 70±5° C. for 20 hours. Then, the surface roughness of the wet paper-carrying surface 111 in the wet state is measured. For measuring the surface roughness, any methods may be used such as contact-type measurement using a contact-type roughness meter, an atomic force microscope, etc., and non-contact-type measurement using a white light interferometer, a laser microscope, etc., though it is preferred to employ contact-type measurement. Note that the temperature of the constant temperature water bath can be 70° C.±5° C.

Next, in warm water bathing at 70±5° C., the wet paper-carrying surface 111 of the first resin layer 11 is brought into contact with a metal plate having a surface roughness equal to or less than 0.10 µm at a pressure of 100±3 kg/cm$^2$ for 20 hours. The temperature of the warm water bath can be 70° C.±5° C. The surface roughness of the metal plate can be equal to or less than 0.10 µm, and the material of the metal plate is not particularly limited.

Then, the surface roughness of the wet paper-carrying surface 111 of the wet paper transfer belt 1 after the contact process is measured. This measurement can be carried out in a similar manner as the abovementioned measurement of the surface roughness of the wet paper-carrying surface 111 of the wet paper transfer belt 1 before the contact process. Note that the measurement of the surface roughness may be performed without any particular process after the contact process. However, the sample of the wet paper transfer belt 1 may be immersed in the constant temperature water bath at 70±5° C. for 30 min before measuring the surface roughness.

The roughness holding rate can be calculated using the following formula:

Roughness holding rate (%)=(Surface roughness of wet paper-carrying surface 111 after contact process)/(Surface roughness of wet paper-carrying surface 111 before contact process)×100

The roughness holding rate of the wet paper-carrying surface 111 of the wet paper transfer belt 1 may be equal to or higher than 40%, preferably equal to or higher than 50%, more preferably equal to or higher than 60%. This makes it possible to further suppress changes in wet paper adherence and wet paper detachability of the wet paper transfer belt 1, which further enables a long-term and stable transfer of the wet paper.

Moreover, the arithmetic average roughness Ra based on JIS B0601 of the wet paper-carrying surface 111 in a wet state is not particularly limited, though it is preferably equal to or higher than 0.3 µm and equal to or less than 20 µm, more preferably equal to or higher than 0.5 µm and equal to or less than 12.0 µm, and further preferably equal to or higher than 1 µm and equal to or less than 10 µm. This further ensures the aforementioned excellent adherence and detachability of the wet paper W with respect to the wet paper transfer belt 1.

As ingredients of the resin 113 which constitutes the first resin layer 11, thermosetting resins such as an urethane resin, epoxy resin and acryl resin, or thermoplastic resins such as a polyamide resin, polyacrylate resin and polyester resin, etc. can be used alone or in combination of two or more. An urethane resin can suitably be used.

The urethane resin used in the resin 113 which constitutes the first resin layer 11 is not particularly limited, though it can be an urethane resin obtained, for example, by reacting one or more polyisocyanate compounds and one or more polyol to give an urethane prepolymer having a terminal isocyanate group, and curing this urethane prepolymer with one or more curing agents that has an active hydrogen group. An aqueous urethane resin, which is anionic, nonionic or cationic urethane resins of either self-emulsifying or forced-emulsion type can also be used.

Among those mentioned above, an aqueous urethane resin is preferably used in the resin 113 which constitutes the first resin layer 11. An aqueous urethane resin is a resin that is formed by using an aqueous dispersion of urethane resin. When the wet paper-carrying surface 111 of the first resin layer 11 is composed of such an aqueous urethane resin, the wet paper-carrying surface 111 would have hydrophilicity, which will improve the adherence of wet paper W to the wet paper-carrying surface 111. This further facilitates controlling the adherence and detachability of the wet paper W by controlling the ruggedness by adjusting the surface roughness of the wet paper-carrying surface 111. Moreover, because the wet paper-carrying surface 111 of the first resin layer 11 will have hydrophilicity, the wet paper transfer belt 1 will be less prone be polluted when being used, which further suppresses changes in properties of the wet paper-carrying surface 111 of the wet paper transfer belt 1.

Furthermore, in the present embodiment, the resin 113 which constitutes the first resin layer 11 has been crosslinked by a crosslinking agent comprising polycarbodiimide. By thus crosslinking the resins close to the wet paper-carrying surface 111 using a crosslinking agent comprising polycarbodiimide, the water resistance and durability of the wet paper-carrying surface 111 can be improved, and the aforementioned roughness holding rate of the wet paper-carrying surface 111 can easily be achieved.

Hereinbelow, the urethane resin and crosslinking agent comprising polycarbodiimide used for the urethane resins will be explained in detail.

As mentioned above, the urethane resin includes, for example, an aqueous urethane resin and/or an urethane resin obtained by reacting one or more polyisocyanate compounds with one or more polyol to give an urethane prepolymer having terminal isocyanate group and curing this urethane prepolymer with one or more curing agents having an active hydrogen group. Note that, urethane resins are all formed using a polyisocyanate compound and a polyol, and a curing agent if necessary. Therefore, hereinbelow, the polyisocyanate compound, polyol and curing agent which constitute the urethane resin will be explained.

Examples of polyisocyanate compounds include aromatic polyisocyanate compounds and aliphatic polyisocyanate compounds, which can be used either alone or in combination of two or more. Aromatic polyisocyanate compounds include, for example, 2,4-tolylene-diisocyanate (2,4-TDI), 2,6-tolylene-diisocyanate (2,6-TDI), 4,4'-methylenebis(phenylisocyanate) (MDI), p-phenylene-diisocyanate (PPDI), dimethylbiphenylene diisocyanate (TODI), naphthalene-1,5-diisocyanate (NDI), 4,4-dibenzyl diisocyanate (DBDI), xylylene diisocyanate (XDI), tetramethylxylylene-diisocyanate (TMXDI), and polymethylene polyphenyl polyisocyanate (Polymeric MDI), etc. Aliphatic polyisocyanate compounds include, but not particularly limited to, for example, chainlike aliphatic polyisocyanates such as 1,6-hexamethylene diisocyanate (HDI) and 1,5-pentamethylene diisocyanate, and alicyclic polyisocyanates such as 1-isocyanate-3-isocyanatemethyl-3,5,5-trimethylcyclohexane (IPDI), dicyclohexylmethane-4,4'-diisocyanate (H12MDI), 1,3-cyclohexyldiisocyanate, 1,4-cyclohexyldiisocyanate (CHDI) and 1,4-bis-(isocyanatemethyl)cyclohexane (H6XDI), which can be used either alone or in combination of two or more.

An aqueous urethane resin is generally composed of an aliphatic polyisocyanate compound. Among those mentioned above, the urethane resin preferably comprises one or more selected from the group consisting of 1-isocyanate-3-isocyanatemethyl-3,5,5-trimethylcyclohexane (IPDI), dicyclohexylmethane-4,4'-diisocyanate (H12MDI) and 1,6-hexamethylene diisocyanate (HDI).

Polyol compounds include, though not being particularly limited to, long-chain polyol compounds, for example, polyester polyols such as polycaprolactone polyol and polyethylene adipate, polyether polyols such as polyethylene glycol, polyoxypropylene glycol, polyhexamethylene ether glycol and polytetramethylene ether glycol (PTMG), polycarbonate polyols such as polycarbonate diol, polyether carbonatediol, trimethylol propane, polybutadiene polyol, perfluoropolyether polyol, and silicon polyols such as silicon diol, which can be used either alone or in combination of two or more.

Polycarbonate polyols include, though not being particularly limited to, for example, a polycarbonate polyol synthesized from a polycarbonate-polyol-material polyol and a polycarbonate source. A polycarbonate-polyol-material polyol include, though not being particularly limited to, for example, a straight-chain or branched-chain alkylene glycol having 2 or more and 20 or less carbon atoms, a hydroxyl group-containing cyclic hydrocarbon having 2 or more and 20 or less carbon atoms, etc., which can be used either alone or in combination of two or more. The above-described straight-chain alkylene glycol includes, for example, ethylene glycol, propane diol, butane diol, pentane diol, hexane diol, heptane diol, octane diol, nonane diol, decane diol, undecane diol, and dodecane diol, etc. The above-described branched-chain alkylene glycol include, for example, 2-methyl-1,3-propane diol, 2,2-dimethyl-1,3-propane diol, 3-methyl-1,5-pentane diol and 2-methyl-1,8-octane diol, etc. The above-described hydroxyl group-containing cyclic hydrocarbon includes, for example, a hydroxyl group-containing alicyclic alkane such as 1,3-cyclohexane diol, 1,4-cyclohexane diol and 1,4-cyclohexane dimethanol.

The curing agent having an active hydrogen group is particularly limited, and one or more compound(s) selected from a group consisting of polyol compounds and polyamines can be used.

As the polyol compound that can be contained in the curing agent, in addition to the above-mentioned long-chain polyol compounds, various aliphatic polyol compounds and various alicyclic or aromatic polyol compounds can be used.

Aliphatic polyol compounds include, though not particularly limited to, for example, alkylene glycol compounds such as ethylene glycol, diethylene glycol, triethylene glycol, tetraethylene glycol, 1,2-propane diol, 1,3-propane diol, dipropylene glycol, tripropylene glycol, 1,2-butane diol, 1,3-butane diol, 1,4-butane diol, 2,3-butane diol, 1,5-pentane diol, 1,5-hexane diol, 1,6-hexane diol, 2,5-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,16-hexadecane diol, 1,18-octadecane diol, 1,20-icosanediol, 2-methyl-1,3-propane diol, neopentyl glycol, 2-butyl-2-ethyl-1,3-propane diol, 3-methyl-1,5-pentane diol, 2-ethyl-1,3-hexane diol, 2-methyl-1,8-octane diol, and glycerin, ditrimethylol propane, trimethylol propane (TMP), pentaerythritol, dihydroxymethyl propionic acid (DHPA).

Alicyclic polyol compounds include, though not particularly limited to, such as, for example, 1,4-cyclohexane dimethanol and hydrogenated bisphenol A.

Aromatic polyol compounds include, though not particularly limited to, such as, for example, hydroquinonebis-3-hydroxyethylether (HQEE), hydroxyphenylether resorcinol (HER), 1,3-bis(2-hydroxyethoxybenzene), 1,4-bis(2-hydroxyethoxybenzene), bisphenol A, an alkylene oxide adduct of bisphenol A, bisphenol S, an alkylene oxide adduct of bisphenol S, etc.

Polyamines include, though not particularly limited to, such as hydrazine, ethylene diamine, 4,4'-methylene-bis-(2-chloroaniline) (MOCA), dimethylthiotoluene diamine (DMTDA), diethyltoluene diamine (DETDA), trimethylene glycol di(p-aminobenzoate) (TMAB), 4,4'-methylene-bis-(3-chloro-2,6-diethylaniline) (MCDEA), 4,4'-methylene-bis-(2,6-diethylaniline) (MDEA), triisopropanol amine (TIPA), p-bis(aminocyclohexyl)methane (PACM), naphthalene-1,5-diamine, xylylene diamine, phenylene diamine, toluene-2,4-diamine, t-butyltoluene diamine, 1,2-bis(2-aminophenyl thioethane), and 2-(2-aminoethylamino)ethanol.

Note that the above-mentioned isocyanate compounds, polyols and/or curing agents may be substituted with one or more hydrophilic group(s). That is, the urethane resin may have one or more hydrophilic group(s). This facilitates self-dispersion of the urethane resin in water, facilitating the production of an aqueous urethane resin. Moreover, the presence of a hydrophilic group in the urethane resin can improve the hydrophilicity of the wet paper-carrying surface 111 of the wet paper transfer belt 1, which can improve the adherence of the wet paper. Such hydrophilic groups include, though not particularly limited to, carboxyl group, sulfo group, phosphate group, hydroxyl group, phenolic hydroxyl group, amino group, etc. One or more of these hydrophilic group(s) may be substituted. Two or more compounds may be substituted with hydrophilic groups, and in which case, the substituting hydrophilic groups may be identical or different in these compounds.

Among those mentioned above, carboxyl group, sulfo group, phosphate group, hydroxyl group, phenolic hydroxyl group and amino group, etc. can be a crosslinking point for reacting with polycarbodiimide mentioned hereinbelow, and therefore contribute to an improvement in the roughness holding rate and to an improvement in the water resistance and durability of the first resin layer 11. Therefore, it is preferred that the isocyanate compound, polyol and/or curing agent comprise(s) one or more selected from the group consisting of a carboxyl group, sulfo group, phosphate group, hydroxyl group, phenolic hydroxyl group, and amino group.

The crosslinking agent crosslinks between the polyurethane macromolecules within the urethane resin and improves the water resistance and durability of the first resin layer 11. In the present embodiment, the crosslinking agent comprises polycarbodiimide. Providing crosslinks between the macromolecules within the resin 113 with the polycarbodiimide can improve the water resistance and durability of the wet paper-carrying surface 111 and can easily achieve the aforementioned roughness holding rate of the wet paper-carrying surface 111.

Polycarbodiimide comprises more than one carbodiimide bonds which react with functional groups such as a hydroxyl group or a carboxyl group, allowing the polycarbodiimide to bind with the surrounding resin. The polycarbodiimide is not limited as long as it comprises more than one carbodiimide bonds, and includes, for example, a compound having a structure indicated by the following formula (1):

(1)

In the above-described formula (1), $R^1$ is, independently for each occurrence, a substituted or unsubstituted bivalent hydrocarbon group having 1 or more and 20 or less carbon atoms, and n is a number of 2.0 or more in number average.

The polycarbodiimide expressed by such formula (1) has many carbodiimide bonds, each of which can react with a functional group of a surrounding resin macromolecule. The polycarbodiimide having a structure of the above-described formula (1) react, for example, with a hydroxyl group contained in a resin macromolecule to form an isourea bond, and the resin macromolecule and the polycarbodiimide are bound via this isourea bond. The polycarbodiimide having a structure of the above-described formula (1) also react, for example, with a carboxyl group contained in a resin macromolecule to form an N-acylurea bond, and the resin macromolecule and the polycarbodiimide are bound via this N-acylurea bond. Therefore, when the polycarbodiimide expressed by the above-described formula (1) is used, the resin 113 of the first resin layer 11 can strongly be cross-linked to sufficiently improve the water resistance and durability. This will also provide a sufficiently high roughness holding rate of the wet paper-carrying surface 111.

In the aforementioned formula (1), $R^1$ can be, in specific, a straight-chain, branched or cyclic, substituted or unsubstituted alkylene group, or a substituted or unsubstituted arylene group, or a group in which two or more of these groups are combined.

Straight-chain alkylene groups include, for example, a methylene group, ethylene group, n-propylene group, n-butylene group, n-pentylene group, n-hexylene group, n-heptylene group and n-octylene group, n-nonylene group, n-decylene group, n-undecylene group, n-dodecylene group, n-tridecylene group, n-tetradecylene group, n-pentadecylene group, n-hexadecylene group, n-heptadecylene group, n-octadecylene group, n-nonadecylene group and n-icosylene group, etc. Branched alkylene groups include 1-methylpropylene group, 2-methylpropylene group, 1,1-dimethylpropylene group, 1,2-dimethylpropylene group, 1,3-dimethylpropylene group, 2,2-dimethylpropylene group, 1,2,3-trimethylpropylene group, 1,1,2-trimethylpropylene group, 1,2,2-trimethylpropylene group, 1,1,3-trimethylpropylene group, 1-methylbutylene group, 2-methylbutylene group, 1,1-dimethylbutylene group, 1,2-dimethylbutylene group, 1,3-dimethylbutylene group, 1,4-dimethylbutylene group, 2,2-dimethylbutylene group, 2,3-dimethylbutylene group, 1,2,3-trimethylbutylene group, 1,2,4-trimethylbutylene group, 1,1,2-trimethylbutylene group, 1,2,2-trimethylbutylene group, 1,3,3-trimethylbutylene group, 1-methylpentylene group, 2-methylpentylene group, 3-methylpentylene group, 1-methylhexylene group, 2-methylhexylene group and 3-methylhexylene group, etc. Cyclic alkylene groups include, though not being particularly limited to, for example, a group having an alicyclic group such as cyclopentane ring, cyclohexane ring, cycloheptane ring or cyclooctane ring. $R^1$ may be attached to an adjacent oxygen atom directly from the alicyclic group or via an alkylene group having 1 or more and 3 or less carbon atoms substituted with the alicyclic group. Such cyclic alkylene groups include, for example, 1,4-cyclohexane-diyl bismethylene group. Arylene groups include a monocyclic aromatic group such as a phenylene group, a condensed polycyclic aromatic group such as a naphthylene group, a non-condensed polycyclic aromatic group such as a biphenylene group.

A compound having a structure expressed by the formula (1) as mentioned above can be obtained by polymerizing polyisocyanate compounds. Therefore, $R^1$ may be a residue of a polyisocyanate compound from which the isocyanate group has been removed. In such cases, $R^1$ can be, for example, a residue of the polyisocyanate compound described above, specifically a residue of a compound such as 2,4-tolylene-diisocyanate (2,4-TDI), 2,6-tolylene-diisocyanate (2,6-TDI), 4,4'-methylene bis(phenylisocyanate) (MDI), 1,6-hexamethylene diisocyanate (HDI), dicyclohexylmethane-4,4'-diisocyanate (H12MDI), 1-isocyanate-3-isocyanatemethyl-3,5,5-trimethylcyclohexane (IPDI), tetramethylxylylene-diisocyanate (TMXDI), or triisopropylidenephenyl diisocyanate, from which the isocyanate group has been removed. Specifically, such $R^1$ includes 1-methylbenzene-2,4-diyl, 1-methylbenzene-2,6-diyl, diphenyl methane-4,4'-diyl, 1,6-hexylene, dicyclohexylmethane-4,4'-diyl, 3,5,5-trimethyl-3-methylenecyclohexane-1-yl, benzene-1,3-dimethylene, triisopropylidenephenyl-diyl, etc.

Substituents for $R^1$ include, though not being particularly limited, for example, a straight-chain or branched alkyl group, a straight-chain or branched hydroxy alkyl group, an aromatic group, and a hydrophilic group described hereinbelow, etc., having 1 or more and 10 or less carbon atoms. Straight-chain alkyl groups include, for example, a methyl group, ethyl group, n-propyl group, n-butyl group, n-pentyl group, n-hexyl group, n-heptyl group, n-octyl group and n-nonyl group, etc. Branched alkyl groups include an i-propyl group, t-butyl group, and i-butyl group, etc. Hydroxy alkyl groups include, for example, a straight-chain alkyl group and branched alkyl group described above in which one or more hydrogen(s) have(has) been substituted with (a) hydroxyl group(s). Aromatic groups include a phenyl group.

In the formula, n may be a number equal to or higher than 2.0 in number average. It is, for example, equal to or higher than 2.0 and equal to or less than 20.0, preferably equal to or higher than 3.0 and equal to or less than 15.0 in number average.

The terminal structure of the polycarbodiimide compound having the structure indicated by the aforementioned formula (1) is not particularly limited. For instance, if it is produced by polymerization of polyisocyanate compounds, its terminal structure can be a residue of a polyisocyanate compound, ($-R^1-N=C=O$ or $-N=C=O$), or an urethane-bond group, urea-bond group or amide-bond group, etc. derived therefrom.

The polycarbodiimide compound expressed by the formula (1) may have a hydrophilic group. Such hydrophilic group include, though not being particularly limited to, carboxyl group, sulfo group, phosphate group, hydroxyl group, phenolic hydroxyl group and amino group, etc. One or more of these hydrophilic groups may be substituted. Moreover, a part of $R^1$ described above and/or a part of the terminal structure may be substituted with a hydrophilic group.

Alternatively, the polycarbodiimide compound may have a hydrophobic group. A part of $R^1$ described above and/or a part of the terminal structure may be substituted with a hydrophobic group.

In the description above, a polycarbodiimide compound of a straight-chain form has mainly been described. However, the polycarbodiimide compound which can be used in the present embodiment is not limited to it, and a polycarbodiimide compound having a branched chain, for example, can also be used.

An amount of polycarbodiimide used in relation to the resin 113 is not particularly limited, though it is, for example, in relation to 100 mass parts of the resin, equal to or more than 0.3 mass parts and equal to or less than 90 mass parts, preferably equal to or more than 0.6 mass parts and equal to or less than 80 mass parts, more preferably equal to or more than 1.0 mass parts and equal to or less than 30 mass parts.

Crosslinking agents may further include a melamine, epoxy or isocyanate-type crosslinking agent, etc. Furthermore, the crosslinking agent can be a crosslinking agent composition comprising a solvent, dispersing agent, surfactant, etc., and may be a liquid (e.g., a solution, dispersion or emulsion). If the crosslinking agent is in a form of a solution, the crosslinking agent can be an aqueous solution.

The crosslinking agent described above may be used as it is admixed with the ingredients for constituting an urethane resin, for example, an urethane prepolymer and curing agent, or it may be used as it is admixed with a dispersion of an aqueous urethane resin. Alternatively, a solution of the crosslinking agent can be used as it is coated onto the wet paper-carrying surface 111 after forming the first resin layer 11 for reaction.

Moreover, the resin 113 which constitutes the first resin layer 11 may comprise an inorganic filler such as titanium oxide, kaoline, clay, talc, diatomaceous earth, calcium carbonate, calcium silicate, magnesium silicate, silica and mica, either alone or in combination of two or more.

The composition and type of the resin materials and inorganic fillers in the first resin layer 11 may be different or identical at each part in the first resin layer 11.

The first resin layer 11 preferably has a water-impermeable property. That is, it is preferred that the first resin layer 11 is water-impermeable.

The reinforcing fibrous substrate layer 13 is composed of a reinforcing fibrous substrate 131 and a resin 133. The resin 133 is present in the reinforcing fibrous substrate layer 13 such that it fills the spaces between the fibers in the reinforcing fibrous substrate 131. That is, a part of the resin 133 is impregnated into the reinforcing fibrous substrate 131, whereas the reinforcing fibrous substrate 131 is buried in the resin 133.

The reinforcing fibrous substrate 131 is not particularly limited, and, for example, a woven fabric consisting of warp yarns and weft yarns woven by a weaving machine, etc. may generally be used. A unwoven grid-like material in which warp rows and weft rows are superimposed on each other can also be used.

The fineness of the fibers constituting the reinforcing fibrous substrate 131 is not particularly limited, and can be, for example, equal to or higher than 300 and equal to or less than 10,000 dtex, preferably equal to or higher than 500 and equal to or less than 6,000 dtex.

The fineness of the fibers constituting the reinforcing fibrous substrate 131 can be different at each part where the fiber is used. For instance, the warp yarns and weft yarns of the reinforcing fibrous substrate 131 may have different fineness.

As ingredients of a reinforcing fibrous substrate 131, polyester (polyethylene terephthalate, polybutylene terephthalate, etc.), aliphatic polyamide (Polyamide 6, Polyamide 11, Polyamide 12, Polyamide 612, etc.), aromatic polyamide (aramid), polyvinylidene fluoride, polypropylene, polyether ether ketone, polytetrafluoroethylene, polyethylene, wool, cotton, metal, etc., may be used either alone or in combination of two or more.

Ingredients of the resin 133 are not particularly limited, and, for example, various resins that can be used for the aforementioned resin 113 of the first resin layer 11 can be used alone or in combination of two or more. The type and composition of the resin 133 may be either identical to or different from those of the resin 113 which constitutes the first resin layer 11.

Note that the composition and type of the resin 133 in the reinforcing fibrous substrate layer 13 may be either different or identical at each part in the reinforcing fibrous substrate layer 13.

A second resin layer (roll surface-side resin layer) 15 is a layer which is built on one principal plane of the reinforcing fibrous substrate layer 13 and composed mainly of a resin 153.

The second resin layer 15 constitutes, on the other principal plane opposite to the principal plane that joins to the reinforcing fibrous substrate layer 13, a roll contact surface 151 for being contacted the roll described hereinafter. When being used, the roll contact surface 151 comes into contact with the roll, so that the wet paper transfer belt 1 can obtain its motive power from the roll for transferring a wet paper.

As the resin 153 which constitutes the second resin layer 15, resin materials that can be used for the first resin layer 11 as mentioned above can be used alone or in combination of two or more. The resin 153 which constitutes the second resin layer 15 may be identical to or different from the resin 113 which constitutes the first resin layer 11 or the resin 133 which constitutes the reinforcing fibrous substrate layer 13 in its type and composition.

Specifically, as the resin 153 which constitutes the second resin layer 15, an urethane resin is preferred in viewpoints of mechanical characteristics, abrasion resistance and flexibility.

Moreover, the second resin layer 15 may comprise one or more inorganic filler(s) in a similar way to the first resin layer 11.

The composition and types of the resin materials and inorganic fillers in second resin layer 15 may be either different or identical at each part of the second resin layer 15.

The dimension of the wet paper transfer belt 1 as mentioned above is not particularly limited, and can appropriately be set according to its intended use.

For instance, the width of the wet paper transfer belt 1 is not particularly limited, though it can be equal to or more than 700 mm and equal to or less than 13500 mm, preferably equal to or more than 2500 mm and equal to or less than 12500 mm. Moreover, the length (circumference) of the wet paper transfer belt 1, for example, is not particularly limited, though it can be equal to or more than 4 m and equal to or less than 35 m, preferably equal to or more than 10 m and equal to or less than 30 m.

Furthermore, the thickness of the wet paper transfer belt 1 is not particularly limited, and it can be, for example, equal to or more than 1.5 and equal to or less than 7.0 mm, preferably equal to or more than 2.0 and equal to or less than 6.0 mm.

The thickness of the wet paper transfer belt 1 may be different or identical at each part.

The wet paper transfer belt 1 as above can be produced, for example, by a method of producing a wet paper transfer belt according to the present embodiment described hereinafter.

As above, the wet paper transfer belt 1 according to the present embodiment can suppress the changes in its wet paper adherence and wet paper detachability by having the roughness holding rate of the wet paper-carrying surface 111 in a wet state equal to or higher than 40%, which enables a long-term and stable transfer of the wet paper. That is, in the wet paper transfer belt 1, the changes in the properties of the wet paper-carrying surface 111 when being used are suppressed.

A modified example of the aforementioned wet paper transfer belt 1 includes an embodiment in which the wet paper transfer belt 1 has a batt fiber layer needled on the wet paper-carrying side and/or roll side of the reinforcing fibrous substrate 131, wherein this batt fiber is impregnated with the aforementioned resin material. As materials for the batt fiber, the materials that can be used in the reinforcing fibrous substrate 131 can be used alone or in combination of two or more.

<2. Method for Producing Papermaking Belt>

Next, an example of a preferred embodiment of a method for producing a papermaking belt of the present invention as described above will be described. FIGS. 2-5 are schematic diagrams showing an example of the preferred embodiment of the method for producing a papermaking belt of the present invention.

The method for producing a papermaking belt of the present invention comprises a step of forming at least one resin layer, wherein:

in which step, at least the resin close to the surface of the resin layer to be formed is crosslinked with polycarbodiimide. Hereinbelow, the aforementioned wet paper transfer belt 1 will be described by way of illustration as an example of the papermaking belt. Accordingly, a method of producing a wet paper transfer belt 1 of the present embodiment comprises a step of forming an annular laminated body 1' having a second resin layer (roll side resin layer) 15 as the innermost layer and a first resin layer (wet paper-carrying side resin layer) 11 as the outermost layer (laminating step), and in this laminating step at least the resin 113 close to the wet paper-carrying surface 111 of the first resin layer 11 is crosslinked with polycarbodiimide.

In this laminating step, an annular and band-shaped laminated body 1' has a second resin layer 15 as the innermost layer and a first resin layer precursor 11' as the outermost layer is formed. Although the laminated body 1' may be formed by any method, in the present embodiment, first, a resin material is coated onto a reinforcing fibrous substrate 131 such that the resin material of the second resin layer 15 will penetrate the reinforcing fibrous substrate 131, thereby forming the reinforcing fibrous substrate layer 13 and at the same time further forming the second resin layer 15 on the inside of the reinforcing fibrous substrate layer 13. Next, a resin material of the wet paper-carrying side resin layer 11 is coated onto the outer surface of the formed reinforcing fibrous substrate layer 13 to form a wet paper-carrying side resin layer precursor 11'.

Figure 2:
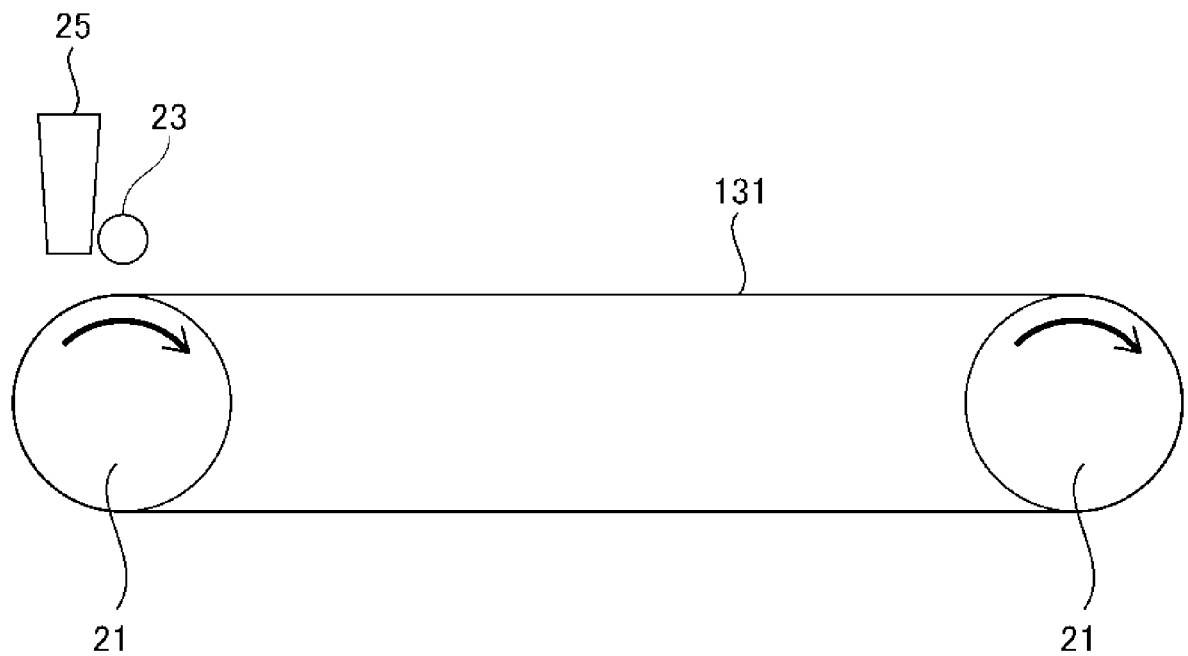
FIG. 2 is a schematic diagram for illustrating a preferred embodiment of a method for producing a papermaking belt according to the present invention.

Specifically, as shown in FIG. 2, the annular and band-shaped reinforcing fibrous substrate 131 is laid over two parallelly arranged rolls 21 such that the reinforcing fibrous substrate 131 comes into contact with the two rolls 21.

Figure 3:
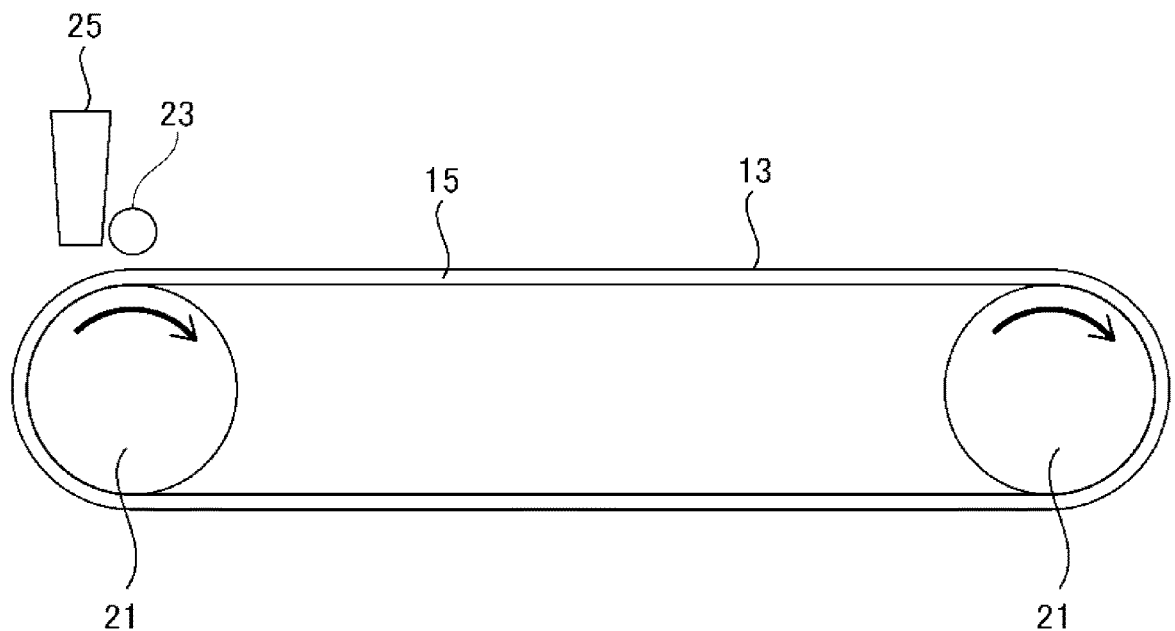
FIG. 3 is a schematic diagram for illustrating a preferred embodiment of a method for producing a papermaking belt according to the present invention.

Next, as shown in FIG. 3, the resin material of the second resin layer 15 is applied to the outer surface of the reinforcing fibrous substrate 131. Although the application of the resin material may be performed by any method, in the present embodiment, it is performed by discharging the resin material from a resin discharge port 25 while rotating the reinforcing fibrous substrate 131 by means of the rolls 21, thus applying the resin material onto the reinforcing fibrous substrate 131. At the same time, a coater bar 23 is used to uniformly coat the applied resin material onto the reinforcing fibrous substrate 131. The resin material applied at this time is capable of penetrating the reinforcing fibrous substrate 131. In the present embodiment, therefore, the resin 133 contained in the reinforcing fibrous substrate 131 as well as the resin 153 which constitutes the second resin layer 15 can be formed, and the reinforcing fibrous substrate layer 13 and the second resin layer 15 can be formed at the same time.

Figure 4:
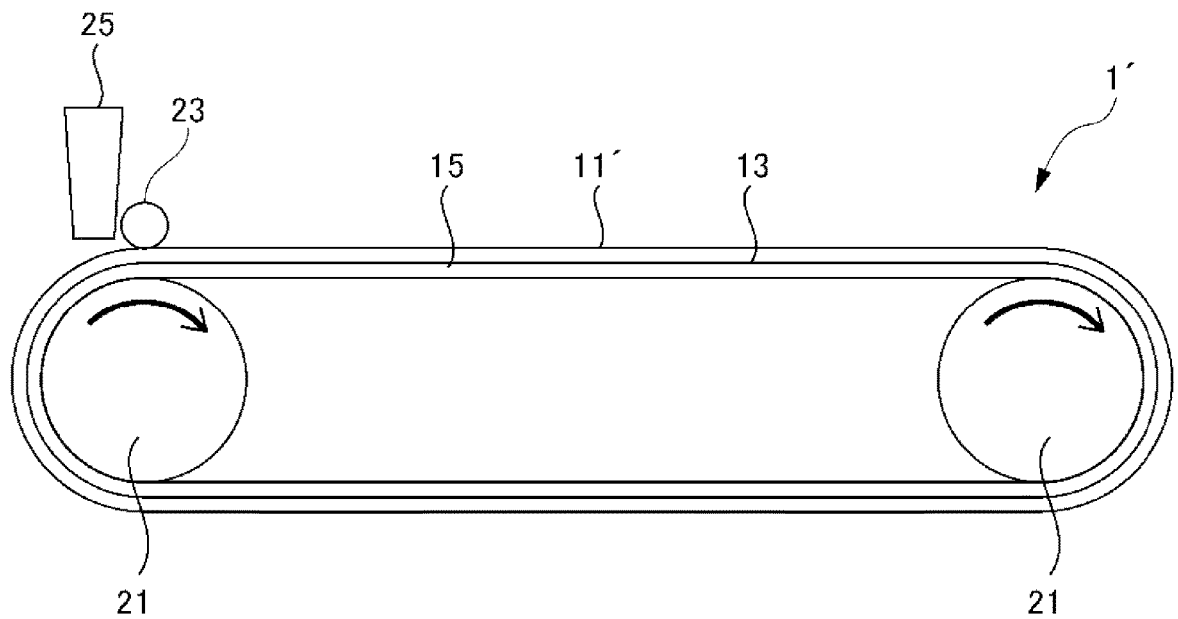
FIG. 4 is a schematic diagram for illustrating a preferred embodiment of a method for producing a papermaking belt according to the present invention.
Figure 5:
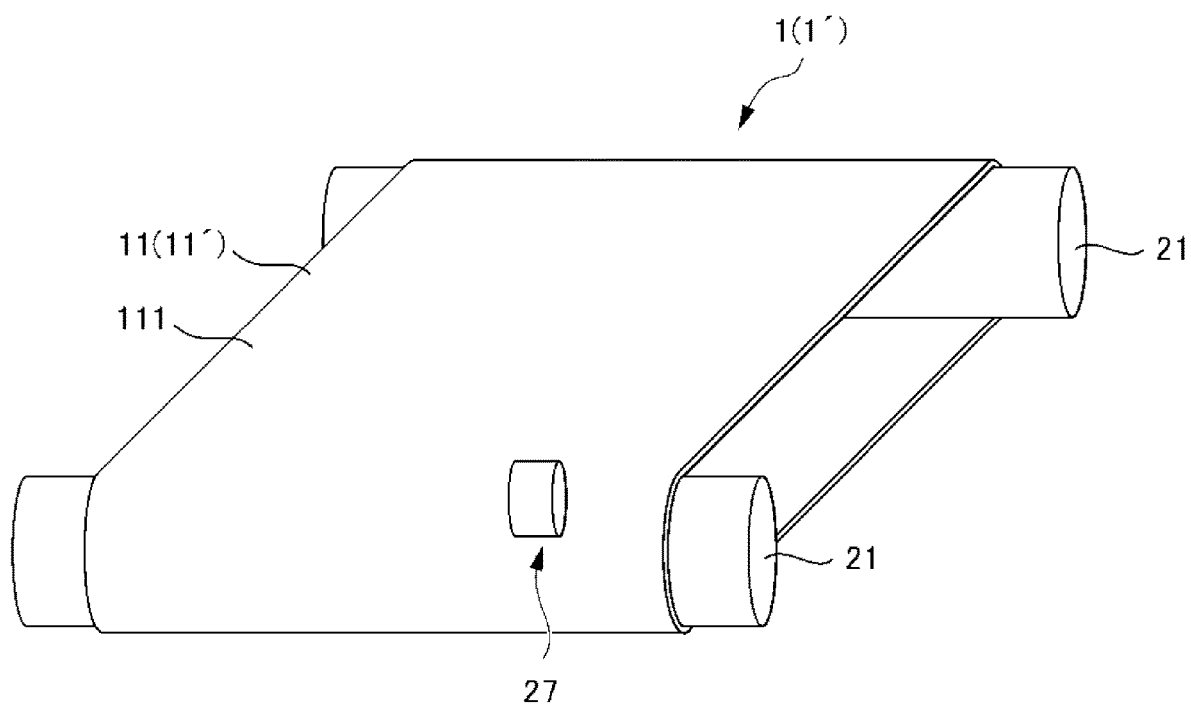
FIG. 5 is a schematic diagram for illustrating a preferred embodiment of a method for producing a papermaking belt according to the present invention.

Next, as shown in FIG. 4, the resin material of the first resin layer 11 is applied to the outer surface of the formed reinforcing fibrous substrate layer 13. Although the application of the resin material may be performed by any method, in the present embodiment, it is performed by discharging the resin material from the resin discharge port 25 while rotating the formed reinforcing fibrous substrate layer 13 and the second resin layer 15 by means of rolls 21, thus applying the resin material onto the outer surface of the reinforcing fibrous substrate layer 13. At the same time, a coater bar 23 is used to uniformly coat the applied resin material. Note that the resin material that constitutes each layer may be applied as a mixture with the aforementioned inorganic filler(s).

As mentioned above, in the present embodiment, at least the resin 113 closed to the wet paper-carrying surface 111 of the first resin layer 11 is crosslinked with polycarbodiimide in this step.

For convenience and certainty, crosslinking of the resin 113 with polycarbodiimide is preferably carried out, for example, by incorporating a crosslinking agent comprising polycarbodiimide in a resin material (resin composition) for forming the first resin layer 11 and effecting the crosslink together with drying as described hereinafter. For instance, when the resin composition for forming the first resin layer 11 comprises an aqueous urethane resin, the crosslinking agent is mixed with an aqueous dispersion of the aqueous urethane. Then, as shown in FIG. 4, the resin material of the first resin layer 11 is applied to the outer surface of the reinforcing fibrous substrate layer 13.

Alternatively, a crosslinking agent may be applied onto the formed first resin layer precursor 11', which may be then crosslinked by drying as described hereinafter. For instance, this method can be employed when it is difficult to admix the crosslinking agent in the resin material for constituting the first resin layer 11.

Next, the applied resin material is dried and crosslinked. This gives the laminated body 1' in which the first resin layer precursor 11', the reinforcing fibrous substrate layer 13 and the second resin layer 15 are laminated in this order from the outer surface. Methods for drying and crosslinking of the resin material are not particularly limited, though they can be performed by, for example, heating, irradiation, etc.

When the resin material is dried and crosslinked by heating, means such as, for example, a far infrared heater and hot air can be used.

Also, when the resin material is dried and crosslinked by heating, the temperature for heating the resin material is preferably equal to or higher than 60° C. and equal to or less than 150° C., more preferably equal to or higher than 90° C. and equal to or less than 140° C. Heating duration can be, for example, equal to or longer than 0.5 hours and equal to or shorter than 30 hours, preferably equal to or longer than 1 hour to and equal to or shorter than 25 hours.

Next, the surface roughness of the outer surface of the wet paper-carrying side resin layer precursor 11' is adjusted to form a wet paper-carrying side resin layer 11 having a wet paper-carrying surface 111 (roughness-adjusting step). This gives a wet paper transfer belt 1 as a papermaking belt in which wet paper-carrying surface 111 has been formed.

The surface roughness of the outer surface can be adjusted, for example, by performing a polishing process and/or buffing process. Specifically, as shown in FIG. 3, this is done by contacting a polishing apparatus 27 or a buffing apparatus (not being illustrated in the diagram) with the laminated body 1' being laid over the two rolls 21. This can provide the wet paper-carrying surface 111 with a desired arithmetic average roughness.

Note that when the wet paper-carrying surface 111 of the wet paper transfer belt 1 has already been in a desired state before the polishing process or buffing process, the polishing process and/or buffing process can be omitted.

In the method for producing a papermaking belt described above, the second resin layer 15 was formed on the inner surface by allowing the roll-side resin material to penetrate from the outer surface of the reinforcing fibrous substrate 131 (Penetration method). However, it is also possible that a resin material which will constitute a second resin layer 15 is applied onto the outer surface of a reinforcing fibrous substrate 131, forming the second resin layer 15 laminated on the reinforcing fibrous substrate layer 13 and the outer surface, which is then inverted inside out and a resin material of the first resin layer 11 is coated onto the outer surface (the former inner surface before inversion) of the reinforcing fibrous substrate layer 13, forming a first resin layer precursor 11' (Inversion method).

Furthermore, a modified embodiment of the above-described method for producing a papermaking belt includes an embodiment using, instead of the above-described reinforcing fibrous substrate 131, a reinforcing fibrous substrate is used in which a batt fiber is needled on the wet paper-carrying side and/or roll side of the reinforcing fibrous substrate. This can give a wet paper transfer belt (papermaking belt) having a first resin layer and/or second resin layer in which the aforementioned batt fiber layer is impregnated with the resin material.

<3. Papermaking Machine>

Figure 6:
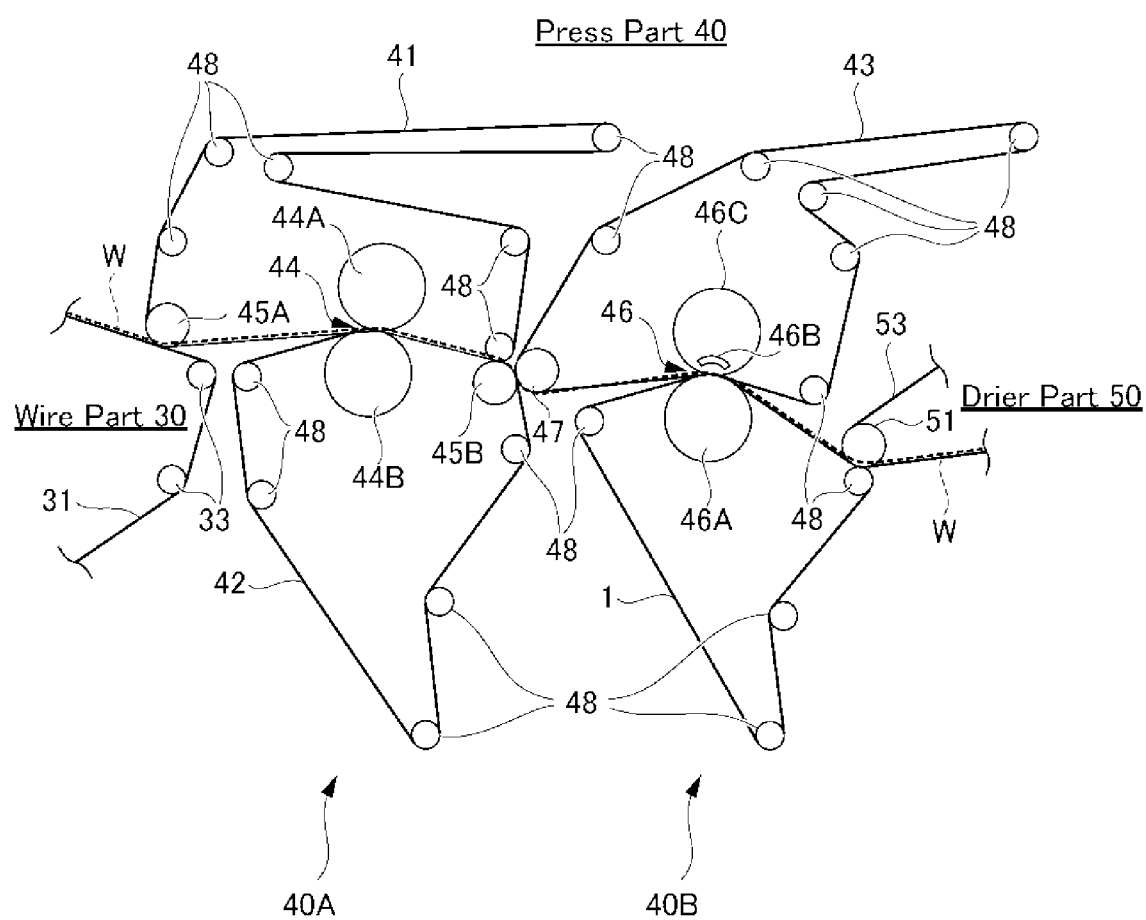
FIG. 6 is a schematic diagram for illustrating one example of a papermaking machine to which a papermaking belt according to the present invention is applied.

Next, an example of a papermaking machine in which the papermaking belt of the present invention is applied. FIG. 6 is a schematic diagram for illustrating an example of a papermaking machine in which the papermaking belt according to the present invention is applied. The papermaking machine shown in FIG. 6 is provided with a wire part 30, a press part 40 and a dryer part 50. In the diagram, the wet paper W indicated by a dashed line is transferred in an order from the wire part 30 to the press part 40 and then to the dryer part 50, and during the transfer process it is dehydrated, squeezed and dried to yield a paper. Moreover, the following papermaking machine is so-called closed-draw type papermaking machine. Therefore, the wet paper W never travels alone during its delivery in the press part 40 where the wet paper W is carried by either the press felts 41, 42, 43 or wet paper transfer belt 1.

The wire part 30 holds a pulp slurry on the wire 31 and at the same time dehydrate it, forming a sheet-like wet paper W. The wire part 30 is of a known configuration and an explanation of its main part shall be omitted. The wet paper W dehydrated in the wire part 30 is transferred by the wire 31 supported by a guide roll 33 to be delivered to the press felt 41 of the press part 40.

The press part 40 is composed of a roll press section 40A and a shoe press section 40B. The roll press section 40A mainly comprises press felts 41 and 42, press rolls 44A and 44B, suction rolls 45A and 45B, and (a) guide roll(s) 48.

The press felts 41 and 42 are endless band-shaped bodies which carry and transfer the wet paper W. The press felts 41 and 42 are arranged such that they pass between the press rolls 44A and 44B, and are supported by more than one guide rolls 48 and the suction rolls 45A and 45B. The suction roll 45A is arranged such that the supported press felt 41 comes into contact with the wire 31 at the upstream side of the transfer direction (flow direction) of the wet paper W. The suction roll 45A sucks the wet paper W, thereby delivering the wet paper W from the wire 31 to the press felt 41.

The press rolls 44A and 44B constitute a roll press mechanism 44, and press and squeeze the wet paper W together with the press felts 41 and 42. The suction roll 45B is arranged such that it supports the press felt 42 at the downstream side of the transfer direction (from direction) of the wet paper W, where the suction roll 45B sucks the wet paper W carried by the press felts 41 and 42, detaching the wet paper W from the press felt 41 so that the wet paper W will be carried by the press felt 42 alone.

The shoe press section 40B mainly comprises the wet paper transfer belt 1, a press felt 43, a shoe press mechanism 46, a suction roll 47 and (a) guide roll(s) 48. The wet paper transfer belt 1 is as mentioned above. The press felt 43 is an endless band-shaped body that carries and transfers the wet paper W. The wet paper transfer belt 1 and the press felt 43 are arranged such that they pass through the shoe press mechanism 46, and are supported by plurality of guide rolls 48 and the suction roll 47.

The suction roll 47 is arranged such that the supported press felt 43 comes into contact with the press felt 42 at the upstream side of the transfer direction (flow direction) of the wet paper W. Then, the suction roll 47 sucks the wet paper W, thereby delivering the wet paper W from the press felt 42 to the press felt 43.

The shoe press mechanism 46 has a press roll 46A, a shoe 46B, and a shoe press belt 46C. The shoe 46B has a recess corresponding to the shape of the press roll 46A, and, together with the press roll 46A and via shoe press belt 46C, compresses the wet paper W being carried by wet paper transfer belt 1 and press felt 43. Here, the configuration is made such that the wet paper W carried by the press felt 43 and transferred into the shoe press mechanism 46 will be carried by the wet paper transfer belt 1 after it passes through the shoe press mechanism 46.

In the dryer part 50, the wet paper W is dried. The dryer part 50 is of a known configuration and an explanation of its main part shall be omitted. A dryer fabric 53 of the dryer part 50 comes into contact with the wet paper transfer belt 1 while being supported by a suction roll 51. Then the suction roll 51 sucks the wet paper W, thereby delivering the wet paper W from the wet paper transfer belt 1 to the dryer fabric 53.

Here, the traveling state of the wet paper W in the above-described papermaking machine will be explained. Since the wet paper W naturally is of a continuous configuration, the state of the movement of a part of the wet paper W will be explained.

First, the wet paper W sequentially passes through the wire 31 of the wire part 30, the press felt 41 of the press part 40, and the roll press mechanism 44, and delivered from press felt 42 to press felt 43. It is then transferred to the shoe press mechanism 46 by the press felt 43. In the shoe press mechanism 46, the wet paper W is sandwiched between the press felt 43 and the wet paper transfer belt 1, and in this state, pressed by the shoe 46B via the shoe press belt 46C and the press roll 46A.

At this point, the press felt 43 has been made highly water permeable, whereas the wet paper transfer belt 1 has been made hardly water permeable. Accordingly, in the shoe press mechanism 46, water from the wet paper W migrates to the press felt 43.

Immediately after coming out of the shoe press mechanism 46, the volume of the press felt 43, the wet paper W and the wet paper transfer belt 1 will be expanded due to being drastically released from the pressure. This expansion and a capillary phenomenon of the pulp fiber constituting the wet paper W cause a so-called rewetting phenomenon in which a part of water within the press felt 43 migrates to the wet paper W.

However, as mentioned before, the wet paper transfer belt 1 has been made hardly water permeable and therefore it does not retain water in its inside. Accordingly, the wet paper transfer belt 1 almost never generates a rewetting phenomenon, and the wet paper transfer belt 1 contributes to an improvement in wet paper-squeezing efficiency. The wet paper W coming out of the shoe press mechanism 46 is transferred by the wet paper transfer belt 1. The wet paper W is then sucked by the suction roll 51 and transferred by the dryer fabric 53 to the dryer part 50.

Here, after the wet paper transfer belt 1 coming out of the shoe press mechanism 46, it is required to have a function of transferring the wet paper W being adhered onto it (wet paper adherence) and a function of smoothly releasing the wet paper W when delivering it to the next part (wet paper detachability) in the wet paper-carrying surface (outer circumferential surface) of the wet paper-carrying side resin layer. The wet paper transfer belt 1 is required to have such conflicting functions, and thus it is necessary to strictly control the adherence of the wet paper-carrying surface 111 of the wet paper transfer belt 1 to the wet paper W.

On the other hand, the wet paper transfer belt 1 will deteriorate during long-term continuous traveling due to the friction and the pressure in the shoe press mechanism 46. Also, to an outer surface of the wet paper transfer belt 1 such as the wet paper-carrying surface 111, impurities contained in the wet paper W such as sizing agents, fillers, and the reactants thereof will attach and accumulate. Thus, in the wet paper transfer belt 1 it is not easy to maintain the properties of wet paper-carrying surface 111 during long-term continuous traveling. However, in the wet paper transfer belt 1 according to the present embodiment, the changes in properties are suppressed by having the roughness holding rate of the wet paper-carrying surface 111 equal to or higher than a predetermined level, and the changes in the wet paper adherence and wet paper detachability are suppressed.

As above, the present invention have been described in detail based on preferred embodiments, though the present invention is not limited thereto. Each component can be substituted with any component that is capable of exerting a similar function, or an optional component can be added.

In the description above, a wet paper transfer belt was described as an example of a papermaking belt, though the present invention is not limited thereto. For instance, the papermaking belt of the present invention may be a shoe press belt or may be other papermaking belt.

Moreover, in the description above, the wet paper-carrying surface 111 of the wet paper transfer belt 1 has been described as being crosslinked with polycarbodiimide, though the papermaking belt of the present invention is not limited thereto, and it may not be crosslinked with polycarbodiimide as long as it has a predetermined roughness holding rate.

EXAMPLES

Hereinbelow, the present invention will more specifically be described with examples, though the present invention is not to be limited to these examples.
1. Production of Wet Paper Transfer Belt
First, wet paper transfer belts of Working Examples 1-6 and Comparative Examples 1 and 2 were produced according to the following configurations.
<Reinforcing Fibrous Substrate>
The reinforcing fibrous substrates used in the wet paper transfer belts of Working Examples 1-6 and Comparative Example 1 and 2 are as follows:
Top warp yarns: Twisted monofilaments of 2000 dtex consisting of Polyamide 6
Bottom warp yarns: Twisted monofilaments of 2000 dtex consisting of Polyamide 6
Weft yarns: Twisted monofilaments of 1400 dtex consisting of Polyamide 6
Fabric: Top and bottom warp yarns: 40 warp yarns/5 cm, weft yarns: 40 weft yarns/5 cm,
double warp weaving pattern
<Formation of Laminated Body>
The reinforcing fibrous substrate was laid over two rolls, then a resin material that constitutes each roll-side resin layer was applied onto the outer surface of each reinforcing fibrous substrate, allowed to penetrate and be laminated to form a reinforcing fibrous substrate layer and a roll side resin layer. Next, on the outer surface of each of the formed reinforcing fibrous substrate layers, a resin material of each wet paper-carrying side resin layer was applied to laminate a wet paper-carrying side resin layer. A laminated body comprising this wet paper-carrying side resin layer as an outermost layer, and a reinforcing fibrous substrate layer and a roll side resin layer in order was heated and dried to give a semifinished product of a wet paper transfer belt.

Resin materials used for constituting each layer of Working Examples 1-6 and Comparative Example 1 and 2 are those shown in Tables 1 and 2, respectively.

In the tables, "PU1" denotes an aqueous dispersion of polyurethane ("ETERNACOLL"® UW-1005D-C1", from UBE INDUSTRIES, LTD.), "PU2" denotes an aqueous dispersion of polyurethane ("ETERNACOLL® UW-1005E", from UBE INDUSTRIES, LTD.), "PU3" denotes an aqueous dispersion of polyurethane ("ETERNACOLL® UW-1005A", from UBE INDUSTRIES, LTD.), and "PU4" denotes an aqueous dispersion of polyurethane ("Bayhydrol® 124", from COVESTRO). They are all urethane resins produced using an aliphatic polyisocyanate compound and polycarbonate diol. In the tables, "C11" denotes an aqueous solution of polycarbodiimide ("CARBODILITE® V-02-L2", from Nisshinbo Chemical Inc.), "C12" denotes an aqueous solution of polycarbodiimide ("CARBODILITE® SV-02", from Nisshinbo Chemical Inc.), and "MF" denotes melamine formaldehyde resin ("Resimene® 747", from INEOS Melamines LLC).

The content of each ingredient described in the tables is the solid content of the compound of interest alone. For instance, in a case of the aqueous dispersion of polyurethane, the amounts of water and additives in the aqueous dispersion are not taken into account, and the solid content of the polyurethane resin is described. Residuals of the resin material include basically water, though the residuals also include levelling agents, antifoaming agents, pH-adjusting agents, thickeners, and organic solvents derived from each of the ingredients.

<Polishing Process and Buffing Process>

The wet paper-carrying surfaces of the wet paper transfer belts (semifinished products) of Working Examples 1-6 and Comparative Example 1 and 2 were polished by a polishing apparatus in which a #80 to #600 polishing cloth paper had appropriately been set. A buffing process was performed as appropriate in order to adjust the surface roughness of the wet paper contact surface, such that the arithmetic average roughness of the wet paper-carrying surface of the wet paper transfer belt of each example was equal to or higher than 0.3 μm and equal to or less than 20 μm. Thus, the wet paper transfer belt was completed. Manufacturing dimensions are 20.5 m in height and 900 mm in width.

2. Evaluation of Wet Paper Transfer Belt 2.1. Roughness Holding Rate and Surface Roughness The roughness holding rates were measured for the wet paper-carrying surfaces of the wet paper transfer belts of Working Examples 1-6 and Comparative Example 1 and 2. The roughness holding rate was evaluated as follows.

First, the surface roughness (arithmetic average roughness) of the wet paper-carrying surface of the wet paper transfer belt before the contact process described hereinafter was measured. The surface roughness of the wet paper-carrying surface of the wet paper transfer belt before the contact process was measured in a wet state. Specifically, first, a sample (a disk of 80 mm in a diameter) of the wet paper transfer belt was immersed in a constant temperature water bath at 70° C. for 20 hours. Next, the surface roughness of the wet paper-carrying surface in the wet state was measured under following conditions. Note that a surface roughness of a wet paper-carrying surface in a wet state is a mean surface roughness measured at five arbitrary points.

Test equipment: SURFCOM 480A (from TOKYO SEIMITSU CO., LTD.)

Measurement conditions: Scanning speed 0.6 m/sec

Test length 8.0 mm

Cut-off value 2.5 mm

Figure 7:
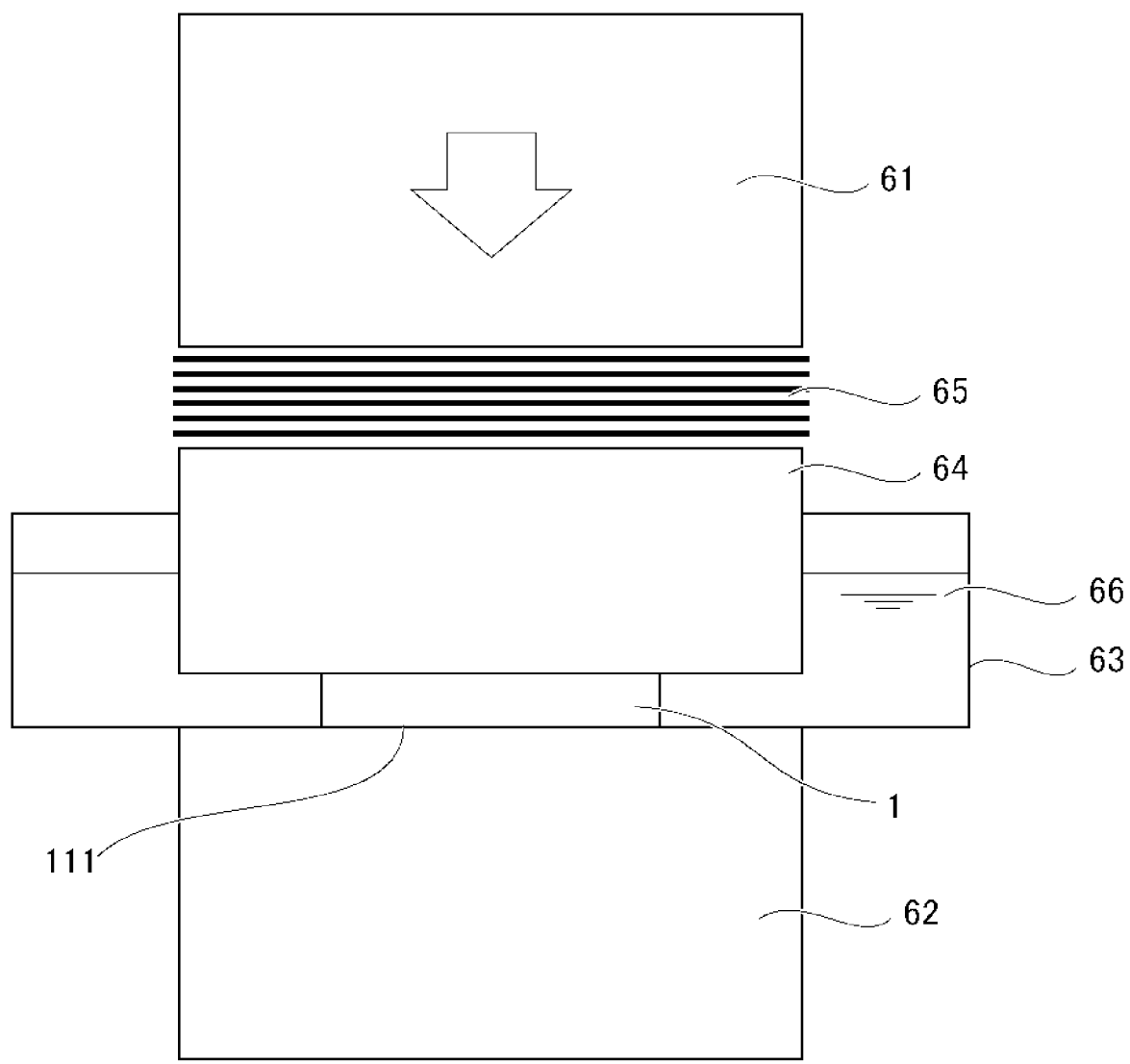
FIG. 7 is a schematic diagram for illustrating the contact process in measuring the roughness holding rate of the resin layer surface.

Next, samples of the wet paper transfer belt were subjected to a contact process. The contact process was performed using the apparatus shown in FIG. 7. As shown in FIG. 7, a stainless steel bat 63 was placed between pressing plates 61 and 62, and the metal bat 63 was filled with warm water 66 at 70° C.±5 to maintain the temperature. Next, a sample of the wet paper transfer belt 1 was placed such that the wet paper-carrying surface 111 came into contact with the bottom of the metal container 63, and subjected to a pressing process with the pressing plate 61 using a stainless steel sheet 64 and eight newsprints 65 as an intermediary. The pressing condition is as follows:

Pressing pressure: 100±3 Kg/cm$^2$

Pressing time: 20 hours

Pressing temperature: 70±5° C.

Surface roughness of the bottom of the metal container 63: 0.05 μm

Next, the surface roughness of the wet paper-carrying surface of the wet paper transfer belt after the contact process was measured in a similar way to the sample before the contact process. The results are shown in Tables 1 and 2.

2.2. Evaluation of Wet Paper-Transfer Ability

The wet paper transfer belts of Working Example 1 and Comparative Example 2 were subjected to a long-term operation to evaluate changes in wet paper transfer ability.

Figure 8:
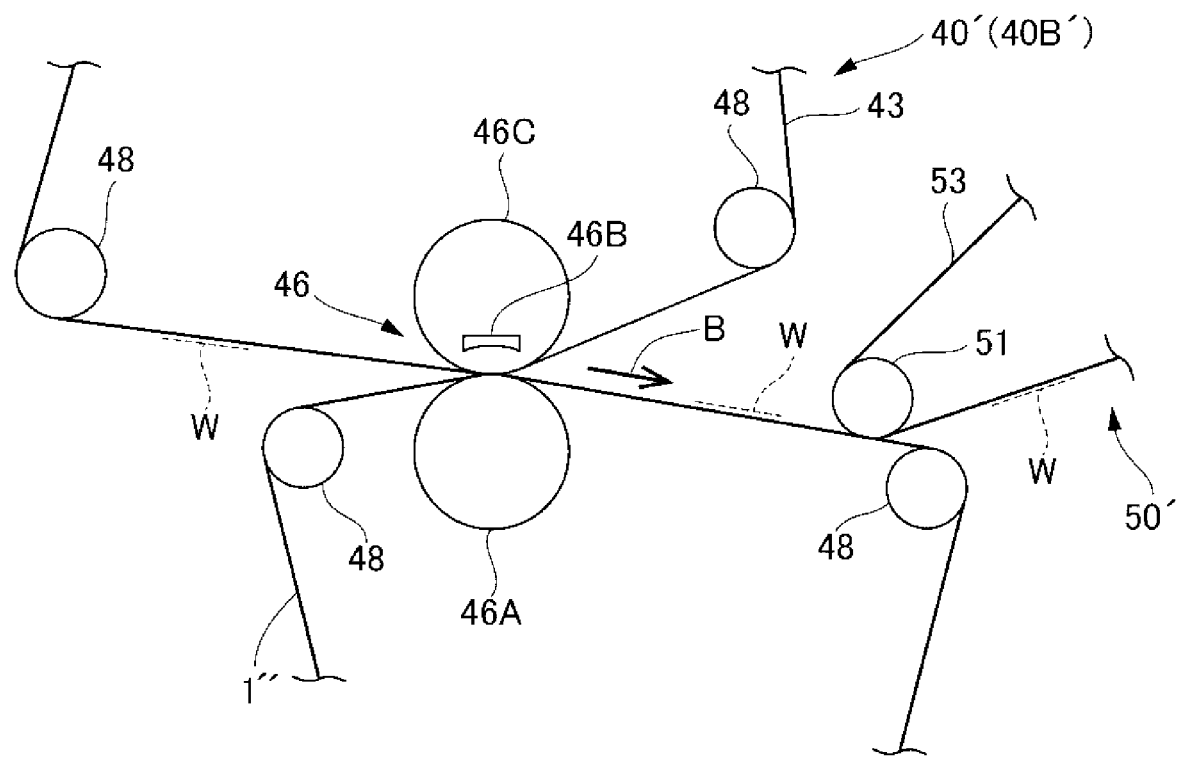
FIG. 8 is a schematic diagram for illustrating an apparatus for evaluating the wet paper transfer ability of a wet paper transfer belt.

Using the apparatus for evaluating a wet paper transfer belt shown in FIG. 8, under the following conditions, the wet paper W was allowed to pass through the press nip 12, and the adherence and detachability of the wet paper W regarding the wet paper transfer belt were evaluated. The evaluation apparatus shown in FIG. 8 has been provided with a press part 40' equipped with a shoe press section 40B', and a dryer part 50'. The press part 40' has an almost the same configuration as the press part 40 shown in FIG. 6 except that the roll press section 40A is omitted. The pressing conditions, the configuration of the press felt 43 and the configuration of the wet paper were as follows. The wet paper transfer belt 1" is a wet paper transfer belt according to Working Example 1 or Comparative Example 2.

<Pressing Conditions>

Papermaking speed: 1200 m/m in

Pressing pressure: 1050 kN/m

<Configuration of Press Felt 43>

For the press felt 43 used, batt fibers were needled on both sides of the base fabric to form an intermediate batt fiber layer (outer circumference side) and lining batt fiber layer (inner circumference side), and another batt fiber was further needled on the outer circumference side of the intermediate batt fiber layer to form a surface batt fiber layer. The configuration of the base fabric and the forming conditions of each batt fiber layer are as follows. As the press felt 43, three types of felts with surface batt fibers of different fineness were prepared. The fineness of the surface batt fiber of each press felt is 3.3 dtex, 6.6 dtex or 11 dtex.

(Base Fabric: Laminated Base Fabric)

Upper Base Fabric

Warp yarns: Monofilaments of 1400 dtex consisting of Nylon 6

Weft yarns: Monofilaments of 500 dtex consisting of Nylon 6

Fabric: 50 warp yarns/5 cm, 40 weft yarns/5 cm, 1/1 plane weaving pattern

Lower Base Fabric

Warp yarns: Twisted monofilaments of 2000 dtex consisting of Nylon 6

Weft yarns: Twisted monofilaments of 1400 dtex consisting of Nylon 6

Fabric: 40 warp yarns/5 cm, 40 weft yarns/5 cm, 3/1 twill weaving pattern (Batt Fiber Needled on Base Fabric)

Surface batt fiber: 200 g/m$^2$ batt fiber consisting of Nylon 6

Intermediate batt fiber: 300 g/m$^2$ batt fiber of 20 dtex consisting of Nylon 6

Lining batt fiber: 100 g/m$^2$ batt fiber of 20 dtex consisting of Nylon 6

At the time of evaluation, water content of the felt 43 was set as follows using a shower and suction box (neither shown in the diagram):

Felt water content: felt water weight/(felt water weight+weight of 1 m$^2$ of the felt)=30% adjustment <Wet Paper (Handmade Sheet)>
Pulp: LBKP 100% csf 450 mL
Basis weight: 60 g/m²
Wet paper water content before pressing:

Wet paper water weight before pressing/(Wet paper water weight before pressing+wet paper absolute dry weight)=60% adjustment (conducting water adjustment over a filter paper)

Wet paper size: Length 200 mm×width 200 mm

<Adherence Determination>

Under the conditions as above, the evaluation of adherence of the wet paper transfer belt 1" was determined by whether the wet paper W was adhered to the wet paper transfer belt 1" when the wet paper W passed through the press nip of the shoe press mechanism 46. For evaluation of adherence of the wet paper transfer belt 1", press felts 43 with surface batt fibers of different fineness were used, and the evaluation was performed under following criteria. Moreover, the evaluation of adherence of the wet paper transfer belt 1" was performed immediately after laying the wet paper transfer belt 1" and after 7 days of operation of evaluation apparatus with water supply.

<Detachability Determination>

The evaluation of detachability of the wet paper transfer belt 1" was determined by whether the wet paper W carried by the wet paper transfer belt 1" would be transferred to the dryer fabric 53. For the evaluation, the degree of vacuum of the suction roll 51 was changed to −20 kPa, −30 kPa or −40 kPa, and whether the wet paper W was transferred to the dryer fabric 53 was confirmed at each degree of vacuum, and the evaluation was performed under following criteria. Moreover, the evaluation of detachability of the wet paper transfer belt 1" was performed immediately after laying the wet paper transfer belt 1" and after 7 days of operation of evaluation apparatus with water supply.

<Evaluation>

A: The wet paper W adhered to the wet paper transfer belt 1" in all case regardless of the fineness of the surface batt fiber of the press felt 43. Moreover, the wet paper W was transferred to the dryer fabric 53 in all case regardless of the degree of vacuum of the suction roll 51.

B: The wet paper W adhered to the wet paper transfer belt 1" when the fineness of the surface batt fiber of the press felt 43 was 6.6 dtex or 11 dtex, whereas the wet paper W did not adhere to the wet paper transfer belt 1" when the fineness of the surface batt fiber was 3.3 dtex. Moreover, the wet paper W was transferred to the dryer fabric 53 when the degree of vacuum of the suction roll 51 was −30 kPa or −40 kPa, whereas the wet paper W was not transferred to the dryer fabric 53 when the degree of vacuum of the suction roll 51 was −20 kPa.

C: The wet paper W adhered to the wet paper transfer belt 1" when the fineness of the surface batt fiber of the press felt 43 was 11 dtex, whereas wet paper W did not adhere to the wet paper transfer belt 1" when the fineness of the surface batt fiber was 3.3 dtex or 6.6 dtex. Moreover, the wet paper W was transferred to the dryer fabric 53 when the degree of vacuum of the suction roll 51 was −40 kPa, whereas the wet paper W was not transferred to the dryer fabric 53 when the degree of vacuum of the suction roll 51 was −20 kPa or −30 kPa.

D: The wet paper W did not adhere to the wet paper transfer belt 1" in any case regardless of the fineness of the surface batt fiber of the press felt 43.

The wet paper transfer ability can be said to be good when it falls under A or B among the evaluations described above. In the evaluation after 7 days of operation, it can be said that the less the evaluation decreases, the less the wet paper transfer ability decreases, and the wet paper transfer ability of the wet paper transfer belt 1" can be said to be stable in terms of a long-term use if it falls under A or B.

TABLE 1

| | | Working Example 1 | | Working Example 2 | | Working Example 3 | | Working Example 4 | | Working Example 5 | | Working Example 6 | |
|---|---|---|---|---|---|---|---|---|---|---|---|---|---|
| | | Type | Mass pts. | Type | Mass pts. | Type | Mass pts. | Type | Mass pts. | Type | Mass pts. | Type | Mass pts. |
| Resin Ingredient Composition | Urethane resin (PU) | PU1 | 23.56 | PU1 | 24.11 | PU1 | 16.45 | PU2 | 23.49 | PU3 | 25.55 | PU4 | 25.87 |
| | Crosslinking agent (CA) | CI1 | 1.26 | CI1 | 0.36 | CI1 | 12.70 | CI1 | 1.25 | CI1 | 1.37 | CI2 | 2.69 |
| | Inorganic filler | Kaolin clay | 15.12 | Kaolin clay | 15.48 | Kaolin clay | 15.48 | Kaolin clay | 15.08 | Kaolin clay | 16.40 | Kaolin clay | 16.61 |
| | CA/PU (%) | 5.3 | | 1.5 | | 77.2 | | 5.3 | | 5.4 | | 10.4 | |
| Evaluation | Surface roughness before contact process (μm) | 5.282 | | 6.669 | | 6.812 | | 6.114 | | 5.387 | | 7.142 | |
| | Surface roughness after contact process (μm) | 3.480 | | 2.668 | | 5.299 | | 4.073 | | 3.644 | | 6.007 | |
| | Roughness holding rate (%) | 66 | | 40 | | 78 | | 67 | | 68 | | 84 | |
| | Wet paper transfer ability (immediately after) | A | | — | | — | | — | | — | | — | |
| | Wet paper transfer ability (after 7 days) | A | | — | | — | | — | | — | | — | |

TABLE 2

| | | Comparative Example 1 | | Comparative Example 2 | |
|---|---|---|---|---|---|
| | | Type | Mass pts. | Type | Mass pts. |
| Resin Ingredient Composition | Urethane resin (PU) | PU1 | 24.35 | PU1 | 23.81 |
| | Crosslinking agent (CA) | — | — | MF | 2.36 |

TABLE 2-continued

|  |  | Comparative Example 1 | | Comparative Example 2 | |
|---|---|---|---|---|---|
|  |  | Type | Mass pts. | Type | Mass pts. |
|  | Inorganic filler | Kaolin clay | 15.12 | Kaolin clay | 15.13 |
|  | CA/PU (%) | — | | | 9.9 |
| Evaluation | Surface roughness before contact process (μm) | | 5.573 | | 6.147 |
|  | Surface roughness after contact process (μm) | | 0.897 | | 1.764 |
|  | Roughness holding rate (%) | | 16 | | 29 |
|  | Wet paper transfer ability (immediately after) | | — | | A |
|  | Wet paper transfer ability (after 7 days) | | — | | C |

As shown in Table 1, it is seen that, as for the wet paper transfer belts according to Working Examples 1-6, the roughness holding rate of the wet paper-carrying surface is equal to or higher than 40% and changes in the properties of the wet paper-carrying surface is suppressed, and it can be stably used for a long time. On the contrary, in the wet paper transfer belt according to Comparative Example 1 using no crosslinking agent, and the wet paper transfer belt according to Comparative Example 2 using a melamine formaldehyde resin as a crosslinking agent, it can be seen that the roughness holding rate of the wet paper-carrying surface is less than 40% and changes in the properties of the wet paper-carrying surface is not suppressed, and they cannot be stably used for a long time.

In fact, when the wet paper transfer ability was evaluated for the wet paper transfer belts of Working Example 1 and Comparative Example 2, the wet paper transfer ability did not decrease and stayed good in the wet paper transfer belt according to Working Example 1 even after performing 7 days of continuous operation. On the contrary, in the wet paper transfer belt according to Comparative Example 2, the wet paper transfer ability decreased after performing 7 days of continuous operation, and it was difficult to be used for a long time.

REFERENCE SIGNS LIST

1 Wet paper transfer belt
11 First resin layer
111 Wet paper contact surface
13 Reinforcing fibrous substrate layer
131 Reinforcing fibrous substrate
15 Second resin layer
151 Roll contact surface
113, 133, 153 Resin

What is claimed is:

1. A papermaking belt for use in a papermaking machine, the papermaking belt comprising:
at least one resin layer comprising a resin,
wherein a surface of the resin layer has, in a wet state, equal to or higher than 40% of a roughness holding rate (%),
   wherein the roughness holding rate (%)=(a surface roughness of the surface after a contact process)/(a surface roughness of the surface in a wet state before the contact process)×100, and
wherein, in the contact process, the surface of the resin layer is contacted with a metal plate having a surface roughness equal to or less than 0.10 μm at a pressure of 100±3 kg/cm² for 20 hours in warm water bathing at 70±5° C.

2. The papermaking belt according to claim 1, wherein at least part of the resin close to the surface of the resin layer has been crosslinked with polycarbodiimide having a structure indicated by the following foimula (1):

$$[R^1\!-\!N\!=\!C\!=\!N]_n \qquad (1)$$

where $R^1$ is, independently for each occurrence, a substituted or unsubstituted bivalent hydrocarbon group having 1 or more and 20 or less carbon atoms, and n is a number of 2.0 or more in number average.

3. The papermaking belt according to claim 1, wherein the surface roughness of the surface of the resin layer in the wet state is equal to or higher than 0.3 μm and equal to or less than 20 μm.

4. The papermaking belt according to claim 1, wherein at least part of the resin close to the surface of the resin layer comprises an N-acylurea bond and/or an isourea bond.

5. The papermaking belt according to claim 1, wherein the resin layer comprises an urethane resin.

6. The papermaking belt according to claim 5, wherein the urethane resin comprises an aqueous urethane resin.

7. The papermaking belt according to claim 1, wherein the surface of the resin layer comprises a wet paper contact surface.

8. The papermaking belt according to claim 1, wherein the papermaking belt is a wet paper transfer belt.

9. The papermaking belt according to claim 1, wherein the papermaking belt is a shoe press belt.

10. A method for making a papermaking belt comprising:
a step of forming at least one resin layer,
wherein at least part of the resin close to the surface of the resin layer to be formed is crosslinked with polycarbodiimide having a structure indicated by the following formula (1):

$$[R^1\!-\!N\!=\!C\!=\!N]_n \qquad (1)$$

where $R^1$ is, independently for each occurrence, a substituted or unsubstituted bivalent hydrocarbon group having 1 or more and 20 or less carbon atoms, and n is a number of 2.0 or more in number average.

* * * * *